US012626001B1

(12) United States Patent
Trivedi et al.

(10) Patent No.: US 12,626,001 B1
(45) Date of Patent: May 12, 2026

(54) COLUMN-LEVEL SECURITY FOR EMBEDDED WORKBOOKS

(71) Applicant: SIGMA COMPUTING, INC., San Francisco, CA (US)

(72) Inventors: Zalak H. Trivedi, San Leandro, CA (US); I-Huei Huang, San Mateo, CA (US); Samuel Andre Abraham Soubeyran, Mountain View, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 135 days.

(21) Appl. No.: 18/412,000

(22) Filed: Jan. 12, 2024

(51) Int. Cl.
| | |
|---|---|
| *G06F 21/00* | (2013.01) |
| *G06F 21/62* | (2013.01) |
| *G06F 40/18* | (2020.01) |

(52) U.S. Cl.
CPC .......... G06F 21/6227 (2013.01); G06F 40/18 (2020.01)

(58) Field of Classification Search
None
See application file for complete search history.

(56) References Cited

U.S. PATENT DOCUMENTS

| | | | | | |
|---|---|---|---|---|---|
| 8,359,299 | B2 * | 1/2013 | Angus | .................. | G06F 16/254 |
| | | | | | 707/705 |
| 8,386,497 | B2 * | 2/2013 | Tsoungui | ............ | G06F 16/2428 |
| | | | | | 707/769 |
| 8,543,836 | B2 * | 9/2013 | Brown | .................. | H04L 9/0863 |
| | | | | | 713/189 |
| 9,015,150 | B2 * | 4/2015 | Raghavan | ............. | G06F 16/838 |
| | | | | | 709/230 |
| 10,366,156 | B1 * | 7/2019 | Krappe | ................. | G06F 40/186 |
| 11,120,210 | B2 * | 9/2021 | Welton | .................... | G06F 40/18 |
| 2007/0027904 | A1 * | 2/2007 | Chow | .................. | G06F 16/283 |
| | | | | | 707/999.102 |
| 2008/0010670 | A1 * | 1/2008 | Campbell | ............. | G06F 40/186 |
| | | | | | 726/3 |
| 2014/0007258 | A1 * | 1/2014 | Anderson | ............... | G06F 21/31 |
| | | | | | 726/28 |
| 2018/0101547 | A1 * | 4/2018 | Greenfield | ............. | G16B 30/20 |
| 2018/0341371 | A1 * | 11/2018 | Callaghan | ............. | G06F 40/177 |
| 2018/0373757 | A1 * | 12/2018 | Schukovets | ........... | G06F 16/221 |
| 2020/0301926 | A1 * | 9/2020 | Frantz | ................. | G06F 16/2308 |
| 2021/0133161 | A1 * | 5/2021 | Woollen | ............... | G06F 16/283 |
| 2022/0382761 | A1 * | 12/2022 | Dodson | ............... | G06F 21/6227 |
| 2023/0168910 | A1 * | 6/2023 | Sobhy Deraz | ........ | G06F 40/106 |
| | | | | | 715/708 |
| 2023/0315893 | A1 * | 10/2023 | Levandoski | .......... | G06F 21/604 |
| | | | | | 726/27 |
| 2025/0103826 | A1 * | 3/2025 | Dicklin | ............... | G06F 16/9032 |

* cited by examiner

*Primary Examiner* — Maung T Lwin

(57) ABSTRACT

Column-level security for embedded workbooks including receiving, by a workbook manager from a third-party user computing system, a request for an embedded workbook, wherein the request comprises a user attribute, and wherein the workbook is generated using a dataset comprising a set of columns; selecting, by the workbook manager, a subset of the set of columns of the dataset to include in the workbook based on the user attribute; retrieving, by the workbook manager, the selected subset of columns from a cloud-based data warehouse; and presenting, by the workbook manager on the third-party user computing system, the workbook comprising the selected subset of columns.

20 Claims, 5 Drawing Sheets

COLUMN-LEVEL SECURITY FOR EMBEDDED WORKBOOKS

BACKGROUND

Field of the Invention

The field of the invention is data processing, or, more specifically, methods, apparatus, and products for column-level security for embedded workbooks.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for column-level security for embedded workbooks including receiving, by a workbook manager from a third-party user computing system, a request for an embedded workbook, wherein the request comprises a user attribute, and wherein the workbook is generated using a dataset comprising a set of columns; selecting, by the workbook manager, a subset of the set of columns of the dataset to include in the workbook based on the user attribute; retrieving, by the workbook manager, the selected subset of columns from a cloud-based data warehouse; and presenting, by the workbook manager on the third-party user computing system, the workbook comprising the selected subset of columns.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
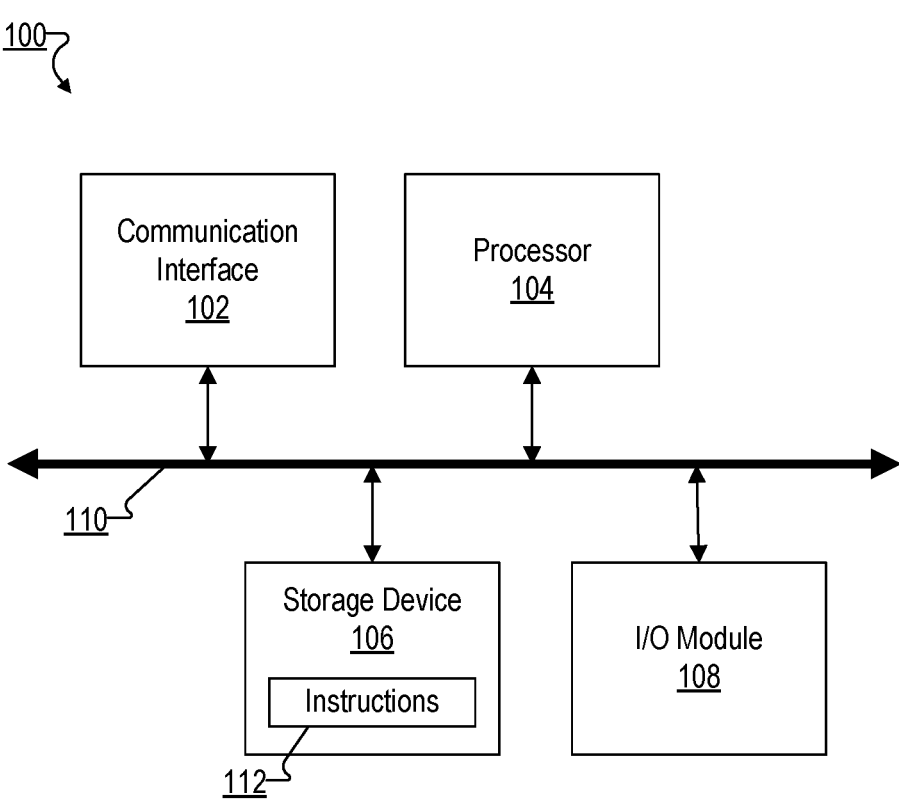
FIG. 1 sets forth a block diagram of an example system configured for column-level security for embedded workbooks according to embodiments of the present invention.

Example methods, apparatus, and products for column-level security for embedded workbooks in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
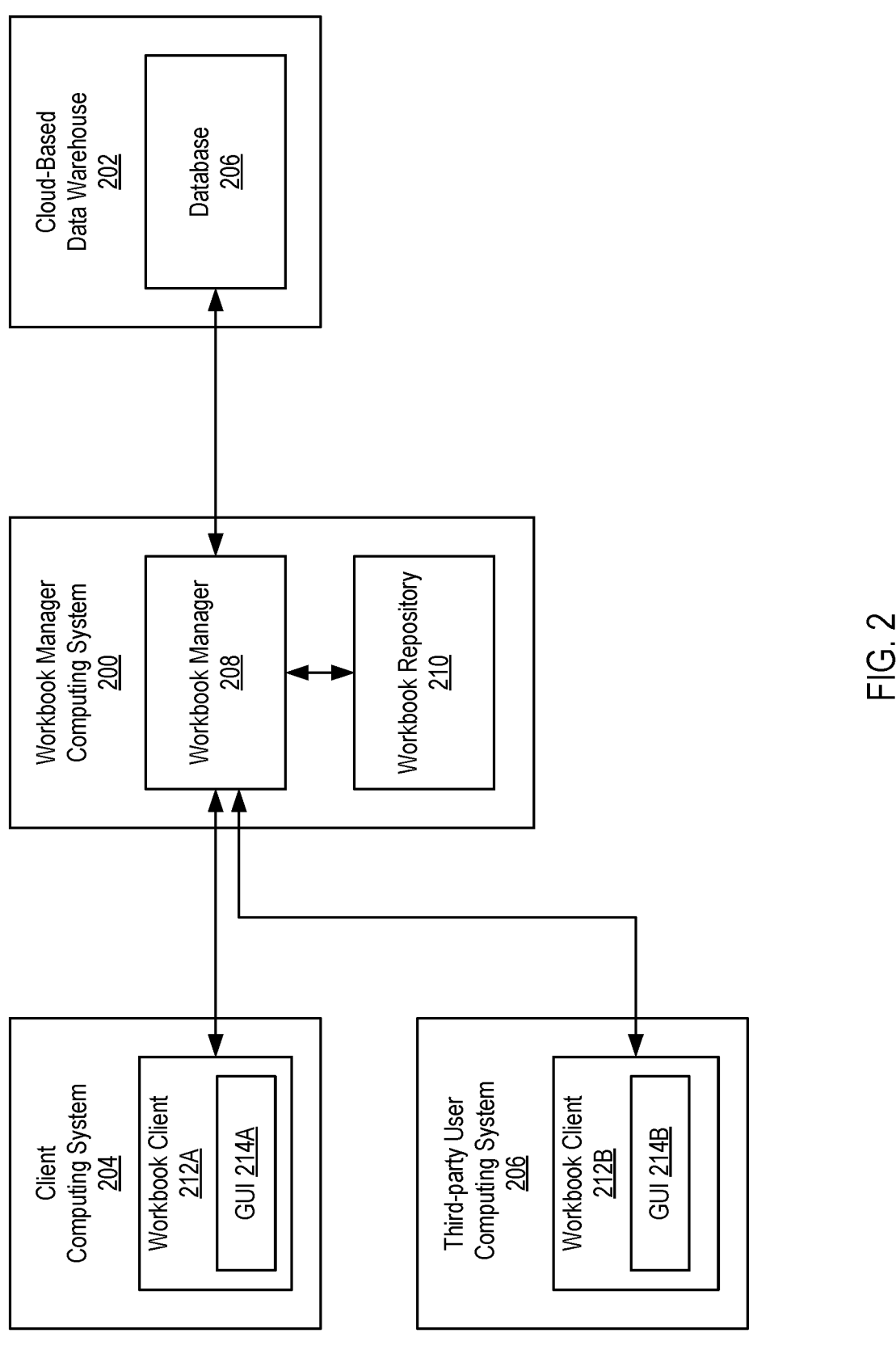
FIG. 2 sets forth a block diagram of an example system configured for column-level security for embedded workbooks according to embodiments of the present invention.

For further explanation, FIG. 2 illustrates a block diagram depicting an exemplary system for column-level security for embedded workbooks according to embodiments of the present invention. As shown in FIG. 2, the system includes a workbook manager computing system 200, a cloud-based data warehouse 202, a client computing system 204, and a third-party user computing system 206. The workbook manager computing system 200 includes a workbook manager 208 and a workbook repository 210. The client computing system 204 includes a workbook client 212A with a graphical user interface (GUI) 214A. The third-party user computing system 206 also includes a workbook client 212B with a GUI 214B. The cloud-based data warehouse 202 includes a database 204.

The workbook manager 208 is hardware, software, or an aggregation of hardware and software configured to present a dataset within a workbook on a client computing system 204 via the workbook client 212A, 212B. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212a, 212b on the client computing system 204 or third-party computing system 206 for presentation to a user of the client computing system 204 or third-party user. The workbook manager 208 may reside on the workbook manager computing system 200, which is an intermediary computing system between each client computing system, each third-party user computing system, and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is an organizing mechanism for data and resides on the workbook manager computing system 200. The dataset may also include instructions for the retrieval of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212A, 212B is a part of the workbook manager 208 and works in concert with the workbook manager 208 to present a workbook on a client computing system 204. The workbook client 212A, 212B may perform local processing of changes made to the workbook and/or the dataset. The workbook client 212A, 212B may be an application executing within a web browser. The workbook client 212A, 212B may be part of an Internet application that includes the workbook manager 208 and is hosted on the workbook manager computing system 200.

The GUI 214A, 214B is a visual presentation configured to present datasets and workbooks to a client or third-party user. The GUI 214 may present a mechanism by which a user can manipulate and effect change to the workbook in the form of a workbook edit. The GUI 214 may be displayed on client computing system 204 or third-party computing system 206 (e.g., on a system display or mobile touchscreen).

The client computing system 204 is a computing system under the control of a client entity. The client entity is an entity with a direct relationship with the workbook manager 208 such that a client account within the client entity is authorized by the workbook manager 208 to access a workbook. The client entity may be a data tenant of the cloud-based data warehouse and control the dataset underlying the workbook. The third-party user computing system 206 is a computing system under the control of a third-party entity. The third-party entity may have no direct relationship with the workbook manager 208. The third party user accounts may gain access to a workbook or underlying dataset via the client entity.

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
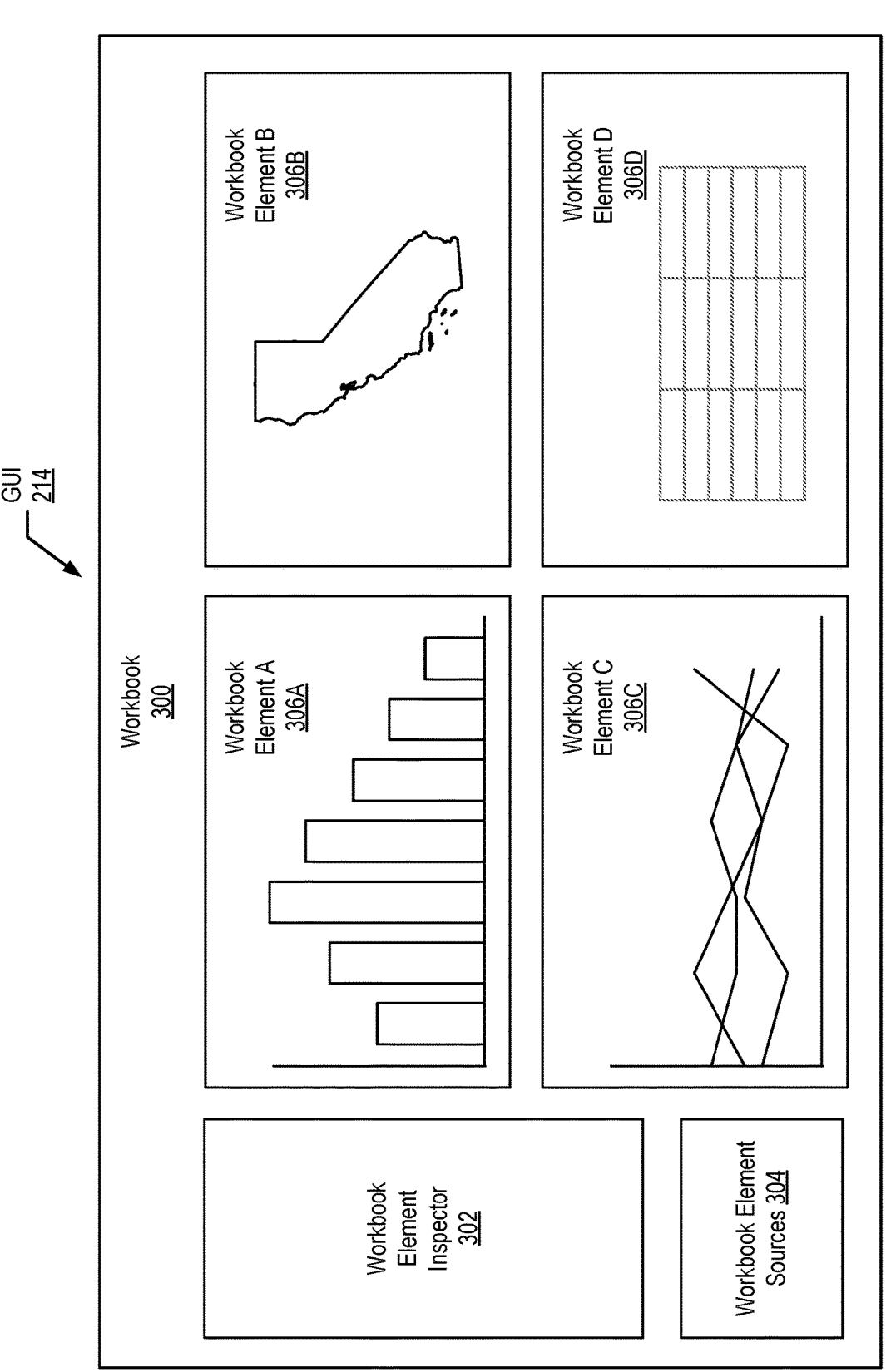
FIG. 3 sets forth a block diagram of an example system configured for column-level security for embedded workbooks according to embodiments of the present invention.

FIG. 3 shows an exemplary GUI for column-level security for embedded workbooks according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
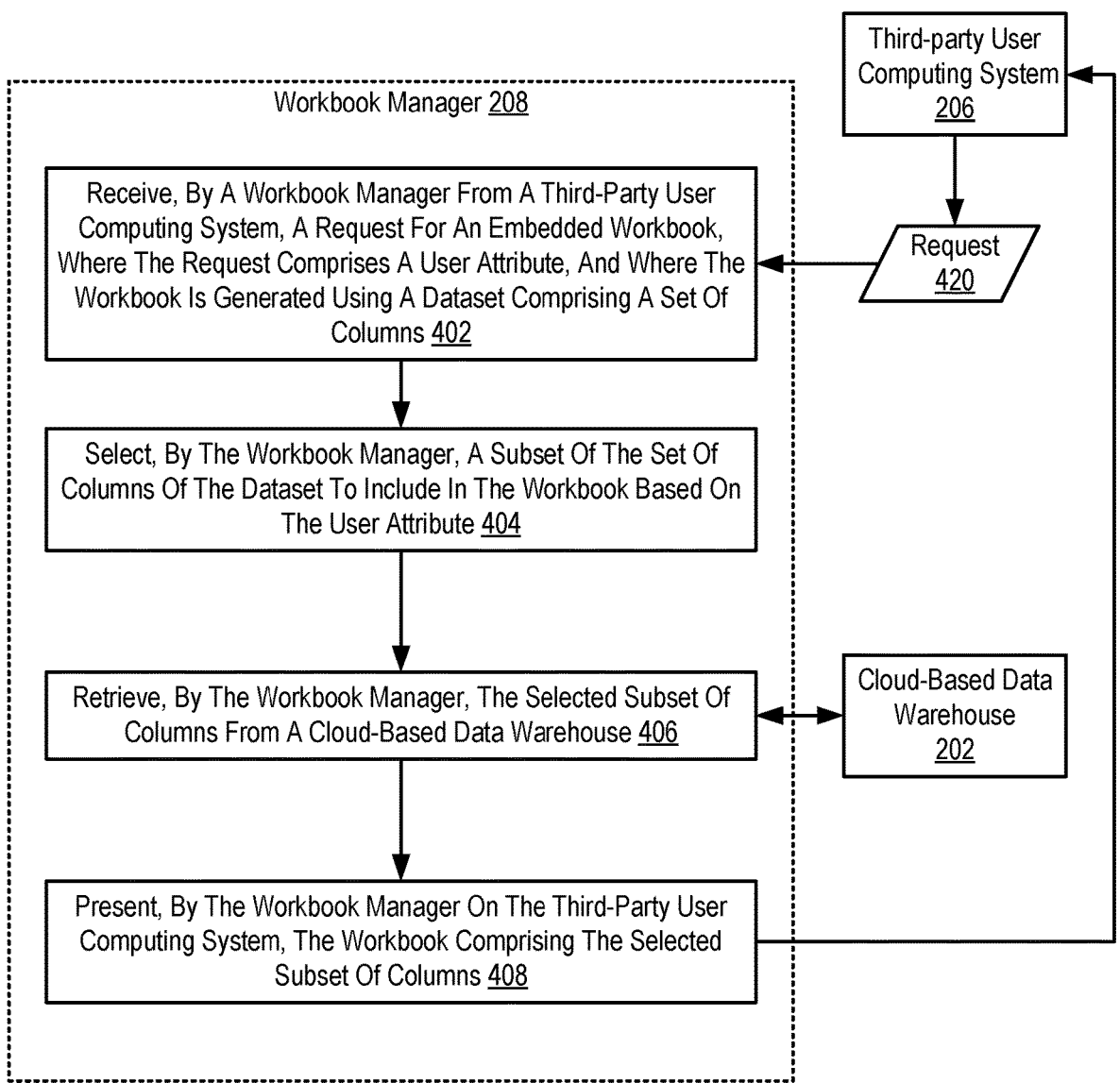
FIG. 4 sets forth a flow chart illustrating an exemplary method for column-level security for embedded workbooks according to embodiments of the present invention.

For further explanation, FIG. 4 sets forth a flow chart illustrating an exemplary method for column-level security for embedded workbooks according to embodiments of the present invention. The method of FIG. 4 includes receiving 402, by a workbook manager 208 from a third-party user computing system 206, a request 420 for an embedded workbook, wherein the request 420 comprises a user attribute, and wherein the workbook is generated using a dataset comprising a set of columns. Receiving 402 the request 420 for an embedded workbook may be carried out by the third-party user account using the third-party user computing system 206 to navigate to a client website or accessing a portion of a client application in which the workbook has been embedded. In response, the request 420 may then be generated on the third-party user computing system 206 and sent to the workbook manager 208.

A domain is a network location hosting websites and other network services under the control of a particular entity (such as a client entity which also controls the client computing system or a third-party entity which also controls the third-party user computing system). A domain may include a webpage or application in which the workbook has been embedded. (e.g., a client domain or third-party domain) The workbook may be embedded using a block of code within the website or application that references the workbook on the workbook manager computing system. The workbook may be created and managed by the client entity (utilizing the workbook manager 208). The workbook may include one or more workbook elements that present data from one or more columns of a dataset. The one or more columns may be from the same or different tables from the cloud-based data warehouse 202.

When the workbook is requested by a third-party user via the client domain or third-party domain, the request includes one or more user attributes. A user attribute is information describing the third-party user account requesting the workbook. The user attribute may be, for example, a description of a third-party entity associated with the third-party user account, the team/third-party entity to which the third-party user account belongs, and authentication information for the third-party user account (e.g., password, authentication token, etc.).

The method of FIG. 4 also includes selecting 404, by the workbook manager 208, a subset of the set of columns of the dataset to include in the workbook based on the user attribute. Selecting 404 the subset of the set of columns of the dataset to include in the workbook based on the user attribute may be carried out by the workbook manager 208 determining, among the set of columns of the dataset, a subset of the set of columns to use for the workbook. Determining the subset of the set of columns to use may include accessing a workbook configuration that identifies columns of the dataset to include or exclude from the workbook provided to the particular third-party user account.

The set of columns of the dataset may include columns relevant to all or most third-party entities (and associated third-party user accounts). The set of columns of the dataset may further include columns only relevant to a single third-party entity (and associated third-party user accounts). The subset of the set of columns of the dataset may include both columns relevant to multiple third-party entities and columns relevant to only a single third-party entity. The set of columns within the dataset may include two or more columns and the subset of the set of columns includes at least one column.

Selecting 404 the subset of the set of columns of the dataset to include in the workbook based on the user attribute may include accessing a repository of user attributes each mapped to a workbook configuration. A workbook configuration is data that identifies columns of the dataset to include or exclude from the workbook provided to a particular third-party user account (based on the user attribute). The workbook manager 208 may store a plurality of workbook configurations in a repository of workbook configurations and map each user attribute that uniquely identifies a third-party user account to one of the workbook configurations.

Selecting 404 the subset of the set of columns of the dataset to include in the workbook based on the user attribute may include selecting or excluding columns based on a column identifier. For example, the subset of columns may include a column name or other identifier that distinguishes the subset of columns for the user attribute from columns outside the subset of the set of columns. The workbook manager 208 may then search the set of columns using a key and select the columns with a column name or other identifier that matches all or a portion of the key.

The subset of the set of columns may include columns relevant to the third-party entity associated with the third-party user account. The user attribute may indicate a third-party entity (e.g., a company) associated with the third-party user account that is requesting the workbook. For example, the third-party entity may be a corporation and the third-party user account may be an employee account for an employee of the corporation. The subset of the set of columns selected for the workbook may include columns relevant to that third-party entity. For example, the subset of the set of columns may include columns of information specific to the third-party entity, columns of information generated by the third-party entity, or a calculation column provided to the client entity by the third-party entity. Similarly, the columns outside the subset of the set of columns may include columns relevant to a second (different) third-party entity.

The method of FIG. 4 also includes retrieving 406, by the workbook manager 208, the selected subset of columns from a cloud-based data warehouse 202. Retrieving 406 the selected subset of columns from a cloud-based data warehouse 202 may be carried out by issuing a database statement to the cloud-based data warehouse; and receiving, in response to issuing the database statement, query results comprising the selected subset of columns. The database statement may be a structured query language statement.

The selected subset of columns may be retrieved from the cloud-based data warehouse without retrieving columns outside the subset of columns. Specifically, the workbook manager 208 need not retrieve each column of the set of columns of the dataset to populate the workbook for the given user attribute. Rather, the workbook manager 208 may only retrieve the subset of the set of columns of the dataset from the cloud-based data warehouse.

The method of FIG. 4 also includes presenting 408, by the workbook manager 208 on the third-party user computing system 206, the workbook comprising the selected subset of columns. Presenting 408 the workbook comprising the selected subset of columns on the third-party user computing system 206 may be carried out by the workbook manager 208 placing the workbook with the selected subset of the set of columns within the domain in which the workbook is embedded. The workbook manager 208 may subsequently prevent the third-party user computing system from accessing columns outside the subset of columns. Specifically, as the third-party user interacts with the workbook, any attempts to access the columns outside the subset of the set of columns will be blocked or met with an error message to the user. Such attempts may include composing a formula that references a column outside the subset of the set of columns.

As an example of the above, consider the following. A company "Rez" may provide a reservation system for different restaurants across the country. Rez (i.e., the client entity) employs the workbook manager to create a workbook to view and manage reservations, all of which are stored on the cloud-based data warehouse. Within Rez's domain, Rez creates a webpage and embeds the reservation workbook into the webpage. Joe's Steakhouse and Jane's Bistro (i.e., third-party entities) both engage Rez to manage their reservations. Rez creates a single workbook that displays different information depending on whether the workbook is requested by a user account from Joe's Steakhouse or a user account from Jane's Bistro. In addition to displaying only the rows (i.e., the reservations) associated with particular restaurant within the workbook, Rez may configure the workbook to only display particular columns depending on which restaurant account is accessing the workbook. Specifically, Rez may only display a column indicating whether the reservation is for a special occasion for Jane's Bistro and not for Joe's Steakhouse. Rez may also only display a column indicating food allergies for the diners for Joe's Steakhouse and not for Jane's Bistro Continuing with the example, a chef for Joe's Steakhouse may log in to Rez's domain and access the webpage embedded with the workbook. As part of retrieving the webpage, a block of code is executed to retrieve the workbook from the workbook manager. This block of code may include a user attribute indicating that the user account is from Joe's Steakhouse. Using the user attribute, the workbook manager may then retrieve the reservation data for Joe's Steakhouse from the cloud-based data warehouse. In doing so, the workbook manager 208 retrieves a subset of the set of columns that includes columns relevant to all restaurants (e.g., reservation date, number in party, etc.) and the column or columns only relevant to Joe's Steakhouse (e.g., the food allergies column). The workbook manager 208 would not retrieve the column indicating whether the reservation is for a special occasion. The subset of the set of columns would then be used to populate the workbook for presentation on the chef's computing system.

The above steps improve the operation of the computer system by allowing a client to create a single workbook to present a different set of columns to different third-party user accounts. This is accomplished by using a user attribute to select a subset of columns for retrieval and presentation to the third-party user account.

Figure 5:
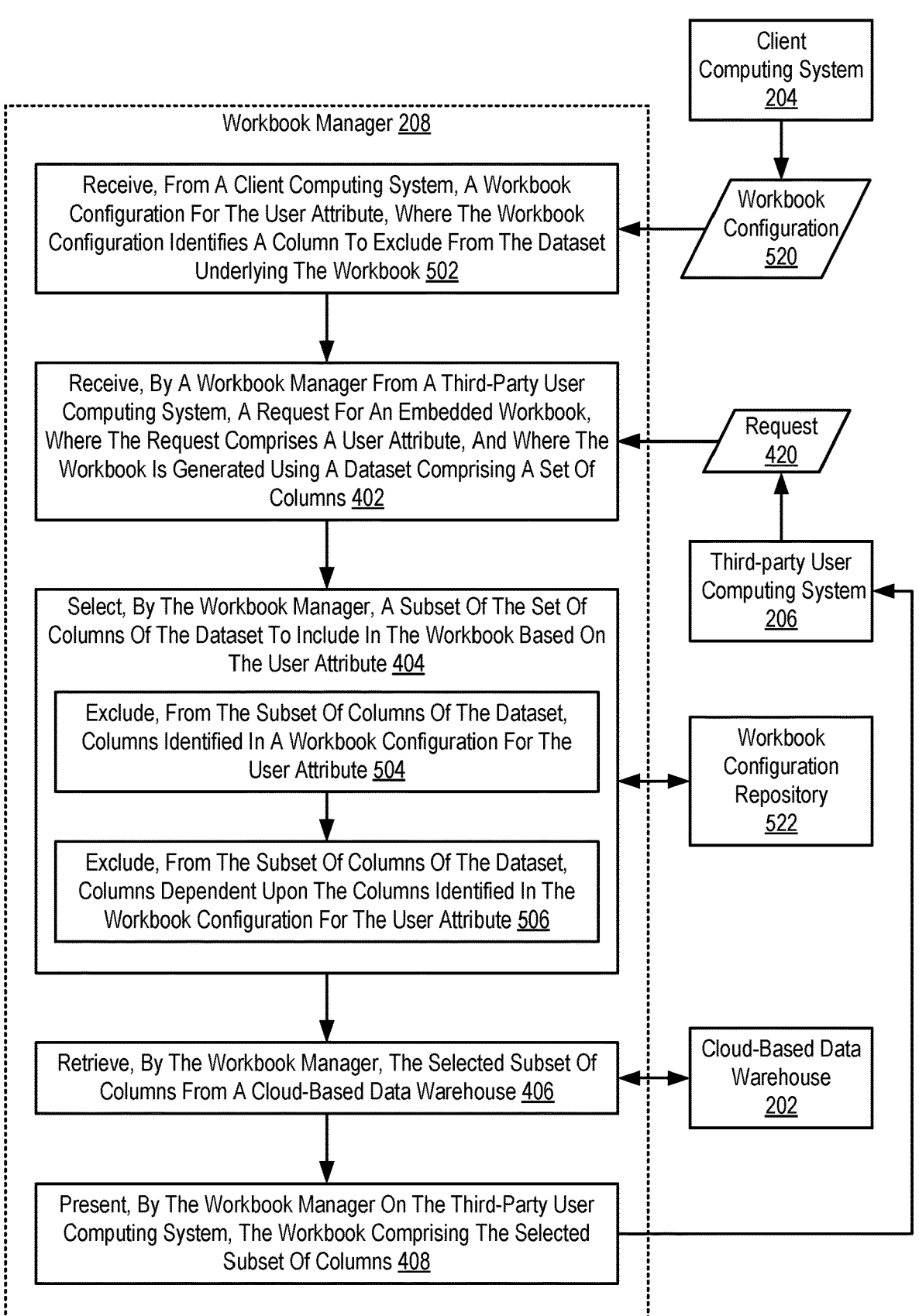
FIG. 5 sets forth a flow chart illustrating an exemplary method for column-level security for embedded workbooks according to embodiments of the present invention.

For further explanation, FIG. 5 sets forth a flow chart illustrating a further exemplary method for column-level security for embedded workbooks according to embodiments of the present invention that includes receiving 402, by a workbook manager 208 from a third-party user computing system 206, a request 420 for an embedded workbook, wherein the request 420 comprises a user attribute, and wherein the workbook is generated using a dataset comprising a set of columns; selecting 404, by the workbook manager 208, a subset of the set of columns of the dataset to include in the workbook based on the user attribute; retrieving 406, by the workbook manager 208, the selected subset of columns from a cloud-based data warehouse 202; and presenting 408, by the workbook manager 208 on the third-party user computing system 206, the workbook comprising the selected subset of columns.

The method of FIG. 5 differs from the method of FIG. 4, however, in that the method of FIG. 5 further includes receiving 502, from a client computing system 204, a workbook configuration 520 for the user attribute, wherein the workbook configuration 520 identifies a column to exclude from the dataset underlying the workbook. Receiving 502 the workbook configuration 520 for the user attribute from a client computing system 204 may be carried out by a client account interacting with the workbook manager to create a workbook configuration for each third-party entity and associated group of third-party accounts. Creating the workbook configurations may include indicating which columns should and should not be presented to which group of third-party accounts.

The method of FIG. 5 also differs from the method of FIG. 4, however, in that selecting 404, by the workbook manager 208, a subset of the set of columns of the dataset to include in the workbook based on the user attribute comprises excluding 504, from the subset of columns of the dataset, columns identified in a workbook configuration 520 for the user attribute; and excluding 506, from the subset of columns of the dataset, columns dependent upon the columns identified in the workbook configuration 520 for the user attribute.

Excluding 504, from the subset of columns of the dataset, columns identified in a workbook configuration 520 for the user attribute may be carried out by retrieving (or deriving) the list of columns to exclude from the workbook configuration 520. Excluding 506, from the subset of columns of the dataset, columns dependent upon the columns identified in the workbook configuration 520 for the user attribute may be carried out by iterating through the workbook elements and determining any workbook elements or other columns that refer to or depend upon a column excluded in the workbook configuration 520. The references to the excluded columns may be removed or set to a null value, or the workbook elements that include the references to the excluded columns may be removed from the workbook.

In view of the explanations set forth above, readers will recognize that the benefits of column-level security for embedded workbooks according to embodiments of the present invention include:

Improving the operation of the computer system by allowing a client to create a single workbook to present a different set of columns to different third-party user accounts, increasing system utility.

Exemplary embodiments of the present invention are described largely in the context of a fully functional computer system for column-level security for embedded workbooks. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for column-level security for a workbook, the method comprising:

receiving, by a workbook manager from a third-party user computing system, a request for the workbook, wherein the request comprises a user attribute, and wherein the workbook is generated using a dataset comprising a set of columns;

selecting, by the workbook manager, a subset of the set of columns of the dataset to include in the workbook based on the user attribute;

retrieving, by the workbook manager, the selected subset of the set of columns from a cloud-based data warehouse; and presenting, by the workbook manager on the third-party user computing system, the workbook comprising the selected subset of the set of columns and a plurality of workbook elements, wherein each workbook element of the plurality of workbook elements refers to one or more columns of the dataset, and wherein presenting the workbook includes:

identifying workbook elements that reference columns excluded from the selected subset of the set of columns; and preventing the workbook elements from exposing the columns excluded from the subset of the set of columns to the third-party user computing system based on the user attribute associated with the third-party user computing system.

2. The method of claim 1, further comprising:

receiving, from a client computing system separate from the third-party user computing system, a workbook configuration for the user attribute, wherein the workbook configuration identifies a column to exclude from the dataset underlying the workbook.

3. The method of claim 1, wherein preventing the third-party user computing system from accessing columns excluded from the subset of the set of columns includes removing workbook elements of the plurality of workbook elements that reference the columns excluded from the subset of the set of columns.

4. The method of claim 1, wherein the selected subset of the set of columns is retrieved from the cloud-based data warehouse without retrieving columns outside the subset of the set of columns.

5. The method of claim 1, wherein selecting the subset of the set of columns of the dataset to include in the workbook based on the user attribute comprises:

excluding, from the subset of the set of columns of the dataset, columns identified in a workbook configuration for the user attribute; and excluding, from the subset of the set of columns of the dataset, columns dependent upon the columns identified in the workbook configuration for the user attribute.

6. The method of claim 1, wherein the user attribute is associated with a third-party entity, and wherein the subset of the set of columns comprises columns relevant to the third-party entity.

7. The method of claim 1, wherein the user attribute is associated with a first third-party entity, and wherein at least one column outside the subset of the set of columns is relevant to a second third-party entity.

8. The method of claim 1, wherein selecting the subset of the set of columns of the dataset to include in the workbook based on the user attribute comprises accessing a repository of user attributes each mapped to a workbook configuration that identifies columns to exclude from the dataset underlying the workbook.

9. The method of claim 1, wherein retrieving the selected subset of the set of columns from the cloud-based data warehouse comprises:

issuing a database statement to the cloud-based data warehouse; and receiving, in response to issuing the database statement, query results comprising the selected subset of the set of columns.

10. The method of claim 1, wherein the workbook manager is hosted on an intermediary computing system between the third-party user computing system and the cloud-based data warehouse.

11. An apparatus for column-level security for a workbook, the apparatus comprising a computer processor, a computer memory operatively coupled to the computer processor, the computer memory having disposed within it computer program instructions that, when executed by the computer processor, cause the apparatus to carry out:

receiving, from a third-party user computing system, a request for the workbook, wherein the request comprises a user attribute, and wherein the workbook is generated using a dataset comprising a set of columns;

selecting a subset of the set of columns of the dataset to include in the workbook based on the user attribute;

retrieving the selected subset of the set of columns from a cloud-based data warehouse; and presenting, on the third-party user computing system, the workbook comprising the selected subset of the set of columns and a plurality of workbook elements, wherein each workbook element of the plurality of workbook elements refers to one or more columns of the dataset, and wherein presenting the workbook includes:

identifying workbook elements that reference columns excluded from the selected subset of the set of columns; and preventing the workbook elements from exposing the columns excluded from the subset of the set of columns to the third-party user computing system based on the user attribute associated with the third-party user computing system.

12. The apparatus of claim 11, wherein the computer program instructions further cause the apparatus to carry out:

receiving, from a client computing system separate from the third-party user computing system, a workbook configuration for the user attribute, wherein the workbook configuration identifies a column to exclude from the dataset underlying the workbook.

13. The apparatus of claim 11, wherein preventing the third-party user computing system from accessing columns excluded from the subset of the set of columns includes removing workbook elements of the plurality of workbook elements that reference the columns excluded from the subset of the set of columns.

14. The apparatus of claim 11, wherein the selected subset of the set of columns is retrieved from the cloud-based data warehouse without retrieving columns outside the subset of the set of columns.

15. The apparatus of claim 11, wherein selecting the subset of the set of columns of the dataset to include in the workbook based on the user attribute comprises:

excluding, from the subset of the set of columns of the dataset, columns identified in a workbook configuration for the user attribute; and excluding, from the subset of the set of columns of the dataset, columns dependent upon the columns identified in the workbook configuration for the user attribute.

16. The apparatus of claim 11, wherein the user attribute is associated with a third-party entity, and wherein the subset of the set of columns comprises columns relevant to the third-party entity.

17. The apparatus of claim 11, wherein the user attribute is associated with a first third-party entity, and wherein at least one column outside the subset of the set of columns is relevant to a second third-party entity.

18. The apparatus of claim 11, wherein selecting the subset of the set of columns of the dataset to include in the workbook based on the user attribute comprises accessing a repository of user attributes each mapped to a workbook configuration that identifies columns to exclude from the dataset underlying the workbook.

19. The apparatus of claim 11, wherein retrieving the selected subset of the set of columns from the cloud-based data warehouse comprises:

issuing a database statement to the cloud-based data warehouse; and receiving, in response to issuing the database statement, query results comprising the selected subset of the set of columns.

20. A computer program product for column-level security for a workbook, the computer program product comprising a computer readable medium and computer program instructions stored therein that, when executed, cause a computer to carry out:

receiving, from a third-party user computing system, a request for the workbook, wherein the request comprises a user attribute, and wherein the workbook is generated using a dataset comprising a set of columns;

selecting a subset of the set of columns of the dataset to include in the workbook based on the user attribute;

retrieving the selected subset of the set of columns from a cloud-based data warehouse; and presenting, on the third-party user computing system, the workbook comprising the selected subset of the set of columns and a plurality of workbook elements, wherein each workbook element of the plurality of workbook elements refers to one or more columns of the dataset, and wherein presenting the workbook includes:

identifying workbook elements that reference columns excluded from the selected subset of the set of columns; and preventing the workbook elements from exposing the columns excluded from the subset of the set of columns to the third-party user computing system based on the user attribute associated with the third-party user computing system.

* * * * *